May 15, 1956 — P. D. CORNELIUS — 2,745,303
THUMB SCREW WITH OVERLOAD RELEASE MEANS
Filed June 25, 1954 — 4 Sheets-Sheet 2
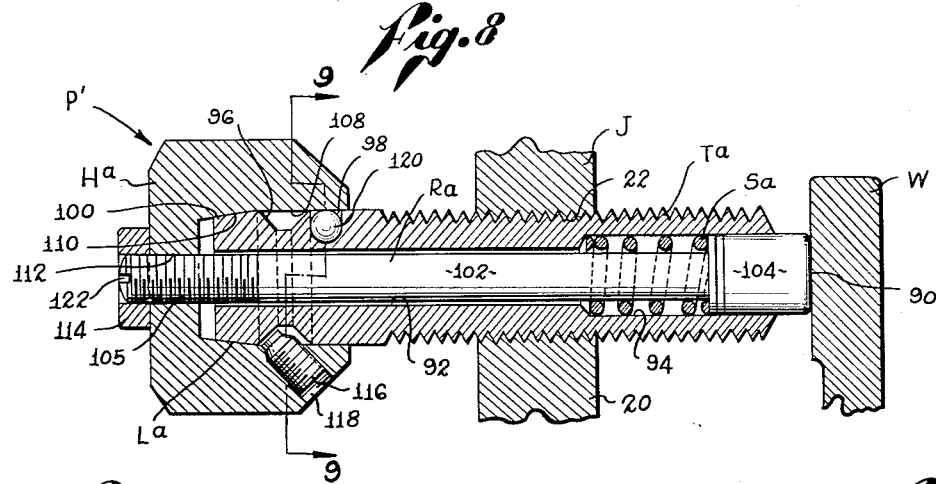
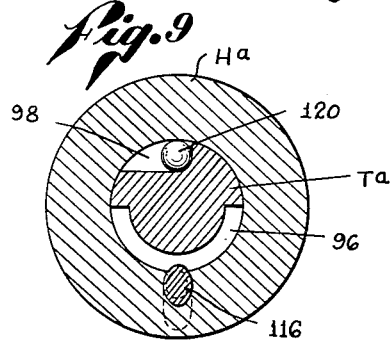
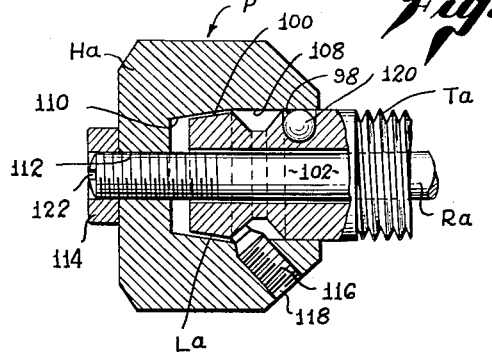
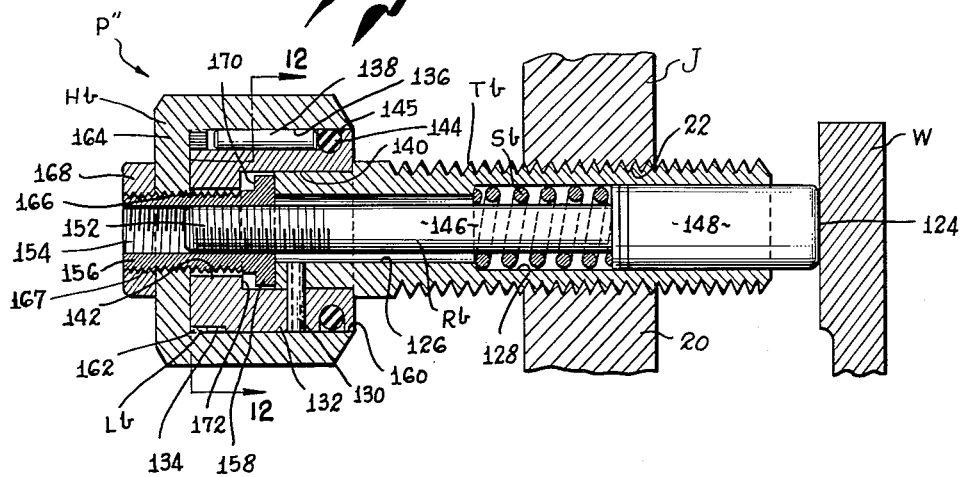
INVENTOR.
PAUL D. CORNELIUS
BY Fulwider Mattingly & Huntley
Attorneys

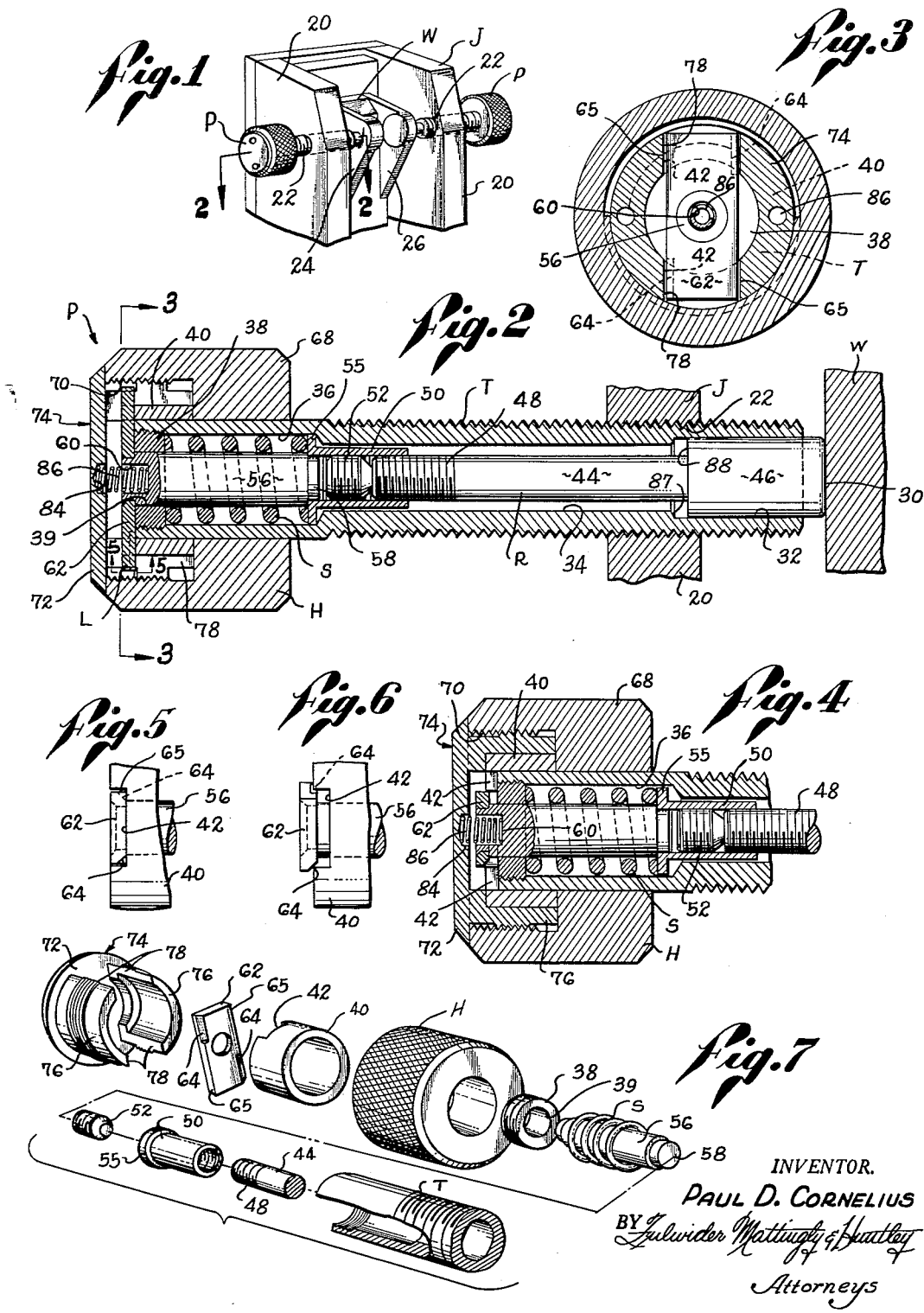

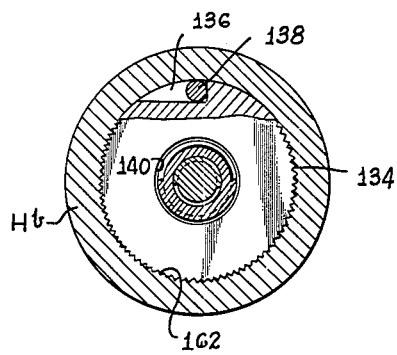
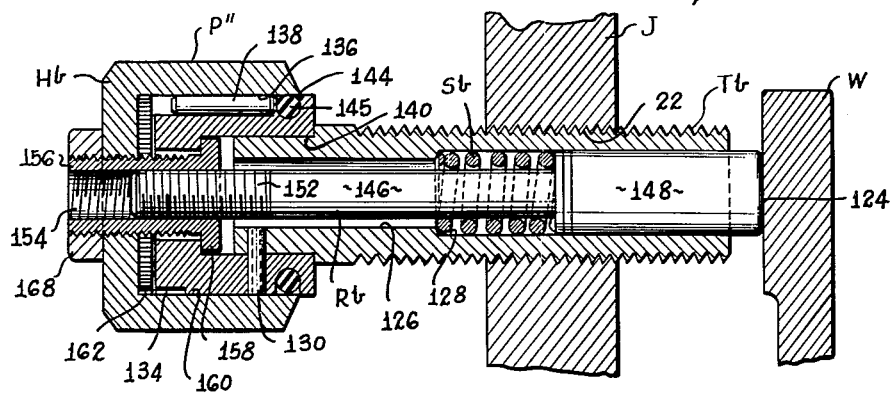
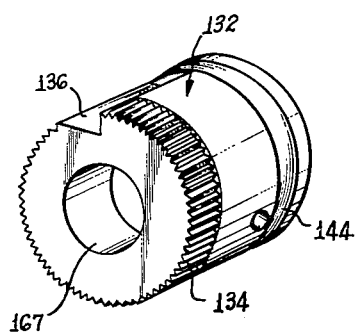

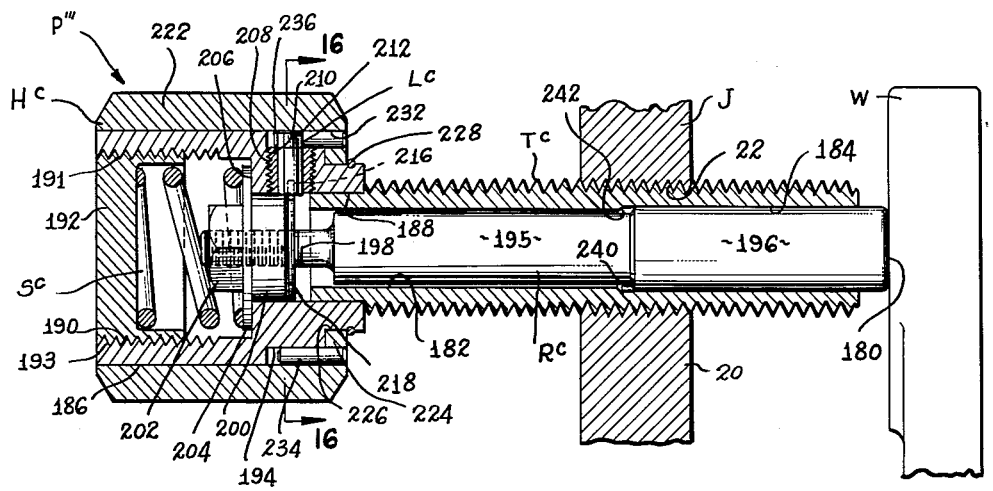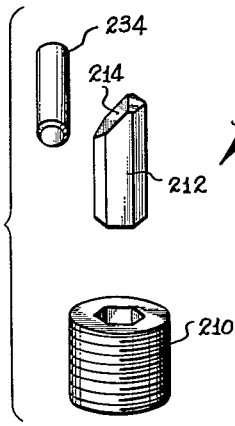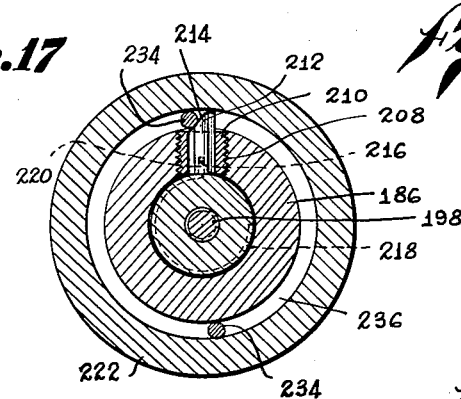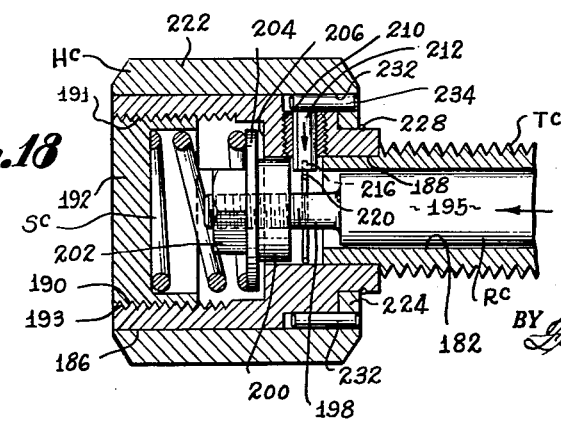

United States Patent Office 2,745,303
Patented May 15, 1956

2,745,303

THUMB SCREW WITH OVERLOAD RELEASE MEANS

Paul D. Cornelius, Burbank, Calif., assignor to Vlier Engineering, Inc., Los Angeles, Calif., a corporation of California Application June 25, 1954, Serial No. 439,295

17 Claims. (Cl. 81—52.4)

The present invention relates generally to the field of metal working and more particularly to a novel thumb screw with overload release utilized to clamp a workpiece in position to be machined.

In the field of metal machining it is common to clamp a workpiece within a jig or fixture whereby the workpiece may be machined. Where the workpiece is of a fragile or relatively easily deformed nature the pressure exerted thereagainst must not exceed a certain limit. To this end it has been heretofore proposed to utilize so-called "torque thumb screws" for holding the workpiece. The heretofore-proposed torque thumb screws have generally consisted of a screw member which is threaded through a complementary threaded bore in the jig or fixture so that its front end may engage the workpiece. The rear end of the screw member mounts a head that is manually rotated for effecting a concurrent rotation of the screw member. Interposed between the rear end of the screw member and the head are torque responsive means that serve to disengage the head member from the screw member when the resistance of the latter against rotation reaches a predetermined value, such resistance against rotation resulting from the engagement of the front end of the screw member with the workpiece.

Although these heretofore-proposed devices are generally satisfactory in operation where the resistance against rotation developed between the screw member and the threaded bore of the jig or fixture is of a known value, this value is subject to fluctuation. Thus, this value may vary within wide ranges depending upon the tightness of fit between the mating surfaces of the pressure screw and the threaded bore, the presence or absence of foreign matter on these mating surfaces, the state of lubrication existing between such surfaces, and the condition of the threads of these mating surfaces. Accordingly, inasmuch as these heretofore-proposed torque thumb screws rely upon the resistance of the pressure screw against turning, they cannot always provide an accurate indication of the axial force being applied by the pressure screw against a workpiece.

It is a major object of the present invention to provide a novel and improved workpiece engaging device wherein the axial force applied against the workpiece is utilized to control the release of the head from the screw member. With this arrangement, the sensing of the end pressure being exerted by the workpiece engaging device is independent of the thread friction generated between the device and the threaded bore of the workpiece-holding jig. This workpiece engaging device is hereinafter termed a "thumb screw with overload release."

Another object is to provide a pressure screw of the aforedescribed nature which is fool-proof in use even when operated by a comparatively unskilled workman.

A further object is to provide a thumb screw with overload release that is simple in design and rugged of construction whereby it may provide a long and trouble-free service life.

An additional object of the invention is to provide a thumb screw with overload release of the aforedescribed nature which may replace existing torque thumb screws without requiring modification of the jigs and fixtures already developed for use with the latter.

Yet a further object of the invention is to provide a thumb screw with overload release that is economical of construction.

Another object is to provide a thumb screw with overload release which is adapted to withstand vibration, shock and the presence of foreign matter without losing its accuracy.

These and other objects and advantages of the present invention will become apparent from the following detailed description, when taken in conjunction with the appended drawings wherein:

Figure 1 is a perspective view showing a workpiece being held within a jig by means of a pair of thumb screws embodying the present invention;

Figure 2 is a central sectional view of a first form of thumb screw embodying the present invention;

Figure 3 is a vertical sectional view taken on line 3—3 of Figure 2;

Figure 4 is a fragmentary central sectional view of the thumb screw of Figure 2 showing certain of its parts in a different position;

Figures 5 and 6 are horizontal sectional views taken on line 5—5 of Figure 2 and showing the mode of operation of said thumb screw;

Figure 7 is an exploded view of the parts of said thumb screw;

Figure 8 is a central longitudinal sectional view of a second form of thumb screw embodying the present invention;

Figure 9 is a vertical sectional view taken on line 9—9 of Figure 8;

Figure 10 is a fragmentary central longitudinal sectional view showing the parts of the second form of thumb screw disposed in a different position;

Figure 11 is a central longitudinal sectional view of a third form of thumb screw embodying the present invention;

Figure 12 is a vertical sectional view taken on line 12—12 of Figure 11;

Figure 13 is a central longitudinal sectional view showing the parts of said third form of thumb screw disposed in a different position;

Figure 14 is a perspective view of a detail of the thumb screw of Figures 11, 12 and 13;

Figure 15 is a central longitudinal sectional view of the preferred form of thumb screw embodying the present invention;

Figure 16 is a vertical sectional view taken on line 16—16 of Figure 15;

Figure 17 is an enlarged perspective view showing a detail of the thumb screw of Figures 14, 15 and 16;

Figure 18 is a fragmentary central longitudinal sectional view showing the parts of said preferred embodiment disposed in a different position; and Figure 19 is an enlarged sectional view showing a detail of Figure 18.

Referring to the drawings, and particularly Figure 1 thereof, a workpiece W is shown clamped within a jig or fixture J by means of a pair of thumb screws with overload releases P embodying the present invention. The side walls 20 of the jig J are formed with threaded bores 22 wherein the thumb screws P are threadably secured with their front ends in engagement with bifurcations 24 and 26 of the workpiece W. With this arrangement, the workpiece W may be rigidly supported within the jig J for machining purposes. It should be especially noted that although the workpiece must be firmly held within the jig, the force applied by the thumb screws against the bifurcations 24 and 26 must not exceed a predetermined limit. If such a limit is exceeded the bifurcations could be deformed inwardly so as to necessitate the repair or discarding of such workpiece. Accordingly, it is essential that the force applied against the workpiece by the thumb screws P be of limited value. The present invention contemplates the provision of a novel means for limiting the value of this force. It should be particularly noted that other forms of workpieces W may be employed with the thumb screws P of the present invention, and that the type of workpiece W shown in Figure 1 was selected solely for purposes of demonstration.

Referring now to Figures 2 through 7, the first form of thumb screw with overload release P embodying the present invention broadly comprises an externally threaded tube T which is shown threaded into the bore 22 of the jig J; a rod R coaxially slidably disposed within the tube T with its front end 30 abutting one side of the workpiece W; spring means S interposed between the tube and the rod for biasing the rod towards the workpiece; a head H carried by the rear end of the tube T; and lock means L interposed between the head H and the tube T for normally keying them together for concurrent rotation relative to the jig J whereby the tube will be threaded through bore 22 and move axially toward the workpiece W. During such axial movement of the tube T towards the workpiece W, the rod R remains stationary relative to the tube and is hence driven axially rearwardly within the tube. After the rod R has been moved a predetermined distance relative to the tube, the lock means L is rendered inoperative and the head H will rotate freely relative to the tube while the tube remains stationary. In this manner the amount of axial force exerted upon the workpiece W by the rod R is limited to a predetermined value.

More particularly, the tube T is longitudinally bored, having a front bore portion 32, an intermediate bore portion 34 of reduced diameter and a rear bore portion or spring cavity 36 of a larger diameter. The rear end of the spring cavity 36 is closed by means of a plug 38 that is threaded thereinto. This plug 38 is centrally formed with a bore 39. A sleeve 40 is press-fitted onto the rear end of the tube T, which sleeve is formed with a pair of diametrically opposed, aligned notches 42, as indicated in Figures 3 and 7.

The rod R includes an abutment element 44 having its front portion 46 disposed within the front bore portion 32 of the tube T. The main portion of this abutment element is of reduced diameter and its rear end is formed with threads 48 which are engaged within the front portion of an internally threaded collar 50. A set screw 52 is threadably disposed within the collar 50 rearwardly of the abutment element 44. The collar 50 is formed with an annular flange 55 that is slidably disposed within the front portion of the spring cavity 36 of the tube T. The rear portion of the rod R includes a plunger 56 having a front end 58 of reduced diameter that is telescopically received within the rear of the collar 50. The rear end of this plunger element is formed with a blind bore 60. The rear end of the plunger element 56 is likewise rigidly secured to a latch 62 of rectangular configuration. The width of this latch is slightly smaller than the width of the aligned notches 42 of the sleeve 40 of tube T. The outer opposite front edges of the latch are seen to be formed with a bevel, as indicated at 64.

The spring means S consists of a helical compression spring that is interposed between the rear end of the collar 50 and the front end of the plug 38 within the spring cavity 36. With this arrangement, the collar 50 and hence the abutment element 44 of the rod R will constantly be biased forwardly relative to the tube T.

The head H includes an externally knurled main body 68 that is journaled upon the rear portion of the tube T forwardly of the sleeve 40. This head H is formed with a forwardly extending, internally threaded blind bore 70. The rear end of this blind bore is closed by the rear wall 72 of a closure element 74. The closure element 74 is integrally formed with a sleeve portion 76 which extends forwardly from the rear wall 72. The sleeve portion 76 is formed with a pair of diametrically opposed, circumferentially extending aligned notches 78. The intermediate section of the sleeve 76 is formed with external threads that engage the complementary threads formed within the blind bore 70 so as to secure the closure element 72 to the main body 68. The rear wall 72 is centrally formed with a seat 84. A small helical compression spring 86 is disposed with its rear end within this seat 84 and its front end within the blind bore 60 of the plunger element 56 of the rod R. With this arrangement, the head H will constantly be biased rearwardly relative to the tube T.

In operation, the parts of the thumb screw P will initially be disposed as shown in Figures 2 and 5. At this time the latch element 62 will be positioned within the aligned notches 42 and 78 of the sleeves 40 and 76, respectively. The head H will then be manually rotated in a clockwise direction relative to Figure 3, and since the head and tube are interlocked by means of the latch element 62 they will undergo concurrent rotation. In this manner the tube will be threaded through the jig bore 22 whereby the front end of the rod R will apply pressure against the workpiece W. As the tube moves axially to the right in Figure 2, the rod R will remain stationary relative to the tube and such relative movement between the tube and the rod will gradually cause the notches 42 of the sleeve 40 to move away from the latch element 62, as indicated in Figures 4 and 6. When the latch element 62 and the sleeve 40 have reached their approximate relative positions indicated in these two figures, the continued rotation of the head H will cause the beveled edges 64 of the latch element to cam the latter out of the notches 42. When this occurs, the head will rotate freely relative to the tube T, and hence axial movement of the tube toward the workpiece W will stop. Thus, the latch element 62 and the notched sleeve 40 serve as disengageable lock means between the head H and the tube T. The amount of axial force applied to the workpiece W by the rod R before the latch element 62 is cammed out of the notches 42 is determined by the adjustment of the plug 38 relative to the rear of the tube T.

Referring now to Figure 2, it should be particularly noted that the latch element 62 will become disengaged from the sleeve 40 just as complementary abutment surfaces 87 and 88 of the tube T and rod R, respectively, come into contact. These abutment surfaces 87 and 88 are defined by the shoulder existing between the tube's bore portions 32 and 34, and the shoulder existing between the front portion 46 of the rod's abutment element 44 and the main portion thereof. The engagement of these abutment surfaces insures that the tube T and the rod R will form a positive and unyielding connection between the jig J and the workpiece W. Accordingly, the workpiece W will not vibrate relative to the jig during a machining operation. The engagement of the abutment surfaces 87 and 88 is made to coincide with the camming of the latch element 62 out of the notches 42 of sleeve 40 by the proper adjustment of the rod element 44 relative to the collar 50. This adjustment may be made by unthreading the closure element 74 from the main body 68 of the head H and removing the plunger element 56, so as to provide access to the set screw 52. As indicated in Figure 3, a pair of holes 86 may be formed in the rear closure member for receiving a suitable spanner wrench (not shown).

When it is desired to back the thumb screw P away from the workpiece, the head H will be rotated in the opposite or counter-clockwise direction relative to Figure 3. The latch element 62 will be rotated in unison with the head because of the engagement of the ends thereof with the notches 78 of the latter's sleeve 76. During such rotation of the latch element, its blunt edges 65 will engage the sides of the notches 42 of the tube sleeve 40. These blunt edges 65 will not serve to cam the latch element out of the notches 42 and instead the latch element will impart rotation to the sleeve 40 and hence the tube T. The tube T will thus be threaded out of the jig bore 22 and the rod R moved away from the workpiece W.

Referring now to Figures 8, 9 and 10, the second form of thumb screw with overload release P' embodying the present invention comprises an externally threaded tube $T^a$ shown threaded into the bore 22 of a jig; a rod $R^a$ coaxially slidably disposed within the tube $T^a$ with its front end 90 abutting one side of a workpiece W; spring means $S^a$ interposed between the tube and the rod for biasing the rod towards the workpiece; a head $H^a$ carried by the rear of the tube; and lock means $L^a$ interposed between the head and the tube for normally keying them together for concurrent rotation relative to the jig J whereby the tube will be moved axially towards the workpiece W. In this form of the invention the tube $T^a$ is formed with a coaxial longitudinally extending bore 92. The front portion of this bore 92 is of enlarged diameter and defines a spring cavity 94. The rear portion of the tube is formed with an annular recess 96 and forwardly of this recess the tube is formed with a notch 98 that extends radially inwardly from one side of the tube to a point somewhat beyond the center thereof. The rear extremity of the tube is formed with a lock surface 100 which tapers radially inwardly and rearwardly.

The rod $R^a$ includes a main portion 102 and an abutment element 104 of enlarged diameter. The abutment element 104 is slidably disposed within the front portion of the spring cavity 94 of the tube $T^a$. The spring means $S^a$ is a helical compression spring that is interposed between the rear surface of the abutment element 104 and the rear end of the spring cavity 94. The rear end of the rod's main portion 102 is formed with external threads 105.

The head $H^a$ is formed with a rearwardly extending blind cavity 108. The rear portion of this cavity 108 is formed with a radially inwardly and rearwardly extending lock surface 110 that is complementary to and normally seated upon the tapered lock surface 100 of the tube $T^a$. These two lock surfaces comprise the lock means $L^a$. The head $H^a$ is centrally formed with an internally threaded bore 112 which is threadedly engaged with the threads 105 of the rod R. A lock nut 114 is carried by the rear extremity of the rod $R^a$ for locking the rod and the head together. A stop screw 116 is threadedly secured within a threaded bore 118 formed in the front portion of the head. The radially inner portion of this stop screw 116 is disposed within the semi-annular groove 96 of the tube $T^a$. This stop screw 116 retains the head $H^a$ upon the tube $T^a$ while permitting limited relative axial movement to take place therebetween. A ball element 120 is disposed within the notch 98 of the tube $T^a$.

In operation, the parts of the thumb screw P' will initially be disposed as indicated in Figure 8. As the head $H^a$ is rotated in a clockwise direction relative to Figure 9, it will initially impart concurrent rotation to the tube $T^a$ because of the rotation-resisting engagement of the lock surfaces 100 and 110 whereby the tube will be threaded into the bore 22 of the jig J. The tube $T^a$ will thus be moved axially to the right toward the workpiece W. Since the rod $R^a$ and hence the head $H^a$ will remain stationary relative to the tube $T^a$ during the latter's movement toward the workpiece W, the tapered lock surface 100 of the tube will gradually move way from the complementary tapered lock surface 110 of the head to the right, as indicated in Figure 10. When the lock surfaces 100 and 110 have been sufficiently separated, the head $H^a$ may rotate freely relative to the tube $T^a$ and accordingly the latter will stop its axial movement to the right.

Referring now to Figure 9, rotation of the head $H^a$ in a clockwise direction so as to screw the tube T toward the workpiece W will not be resisted by the ball element 120. When, however, the head is rotated in a counter-clockwise direction the ball element 120 will act as a cam within the notch 98 so as to lock the head to the tube and thereby permit the tube to be backed away from the workpiece W. Thus, the ball element 120 and the notch 98 serve as a backout means in this form of the invention. In order to adjust the amount of force required to disengage the lock surfaces 100 and 110, the rear end of the rod $R^a$ is formed with a slot 122. This slot may be engaged by a screwdriver after the lock nut 114 has been backed off so as to adjust the relative axial positions of the rod and the tube and thereby change the effective force of the spring $S^a$. When the rod has been adjusted the lock nut 114 is again tightened.

Referring now to Figures 11 through 14, the third form of thumb screw with overload release P'' embodying the present invention comprises an externally threaded tube $T^b$ shown threaded into the bore 22 of a jig J; a rod $R^b$ coaxially slidably disposed within the tube $T^b$ with its front end 124 in abutment with one side of the workpiece W; spring means $S^b$ interposed between the tube and the rod for biasing the rod toward the workpiece; a head $H^b$ carried by the rear end of the tube T; and lock means $L^b$ interposed between the head and the tube normally keying them together for concurrent rotation relative to the jig J whereby the tube will be moved axially towards the workpiece. The tube $T^b$ is formed with a longitudinal bore 126 having a front portion of enlarged diameter defining a spring cavity 128. The rear end of the tube is rigidly secured as by a pin 130 to a sleeve, generally designated 132. The rear end of the sleeve 132 is formed with a plurality of axially extending splines 134. A notch 136 is formed in the sleeve for receiving a backout roller 138. The sleeve 132 is formed with a main bore 140 and a smaller bore 142 disposed rearwardly thereof. An annular groove 144 is formed in the front portion of the sleeve for retaining a resilient seal 145.

The rod $R^b$ includes a main body 146 and an abutment element 148 integrally formed on the front portion of the main body. This abutment element 148 is axially slidably disposed within the spring cavity 128 of the tube. The spring means $S^b$ consists of a helical compression spring that is interposed between the rear end of the abutment element 148 and rear end of the spring cavity 128. The rear end of the rod's main body 146 is formed with external threads 152. These threads are engaged with the threads 154 of a collar member 156. The collar includes an annular flange 158 which is disposed within the rear portion of the main bore 140 of the tube sleeve 132. The head $H^b$ is formed with a rearwardly extending blind cavity 160 having an inner diameter slightly larger than the outside diameter of the sleeve 132. The rear portion of this cavity is formed with a plurality of axially extending splines 162 which are complementary to the splines 134 formed on the sleeve 132. These splines 134 and 136 comprise the lock means $L^b$. The rear wall 164 of the head is centrally formed with an internally threaded bore 166. This bore 166 is threadably engaged with external threads 167 formed on the collar 156. A lock nut 168 is carried by the rear end of the collar 156.

In operation, the parts of the thumb screw P'' will initially be disposed in their position of Figures 11 and 12. As the head $H^b$ is rotated in a clockwise direction relative to Figure 12, it will initially impart concurrent rotation to the sleeve 132 and hence the tube $T^b$ by virtue of the inter-engagement of the splines 134 and 162. As the tube $T^b$ is threaded towards the workpiece W, the rod $R^b$ and hence the head $H^b$ will remain stationary relative to the tube and its sleeve 132. Accordingly, the splines 162 of the head H^b will gradually be moved to the left until they are disengaged from the splines 134 of the tube's sleeve 132, as indicated in Figure 13. At this time the head will be free to rotate relative to the sleeve 132 and hence the tube T^b. Referring to Figure 12, in order to back the tube T^b out of the bore 22 away from the workpiece, the head H^b is rotated in a counter-clockwise direction. During such counter-clockwise rotation the backout roller 138 will act as a cam within the notch 136 so as to cause the head to effect concurrent rotation of the sleeve 132 and hence of the tube T^b.

In order that the tube T^b and the rod R^b may provide a positive and unyielding connection between the jig J and the workpiece W, the rear surface of the flange 158 of collar 156 defines an abutment surface 170 which engages a complementary abutment surface 172 defined by the shoulder between the bores 140 and 142 of the sleeve 132, as indicated in Figure 13, when the splines 134 and 162 are disengaged. Adjustment of the force required to effect the disengagement of the splines 134 and 162 may be made by threading or unthreading the rod R^b relative to the collar 156 to thereby change the effective force of the spring S^b. The engagement of the abutment surfaces 170 and 172 is made to coincide with the disengagement of the splines 134 and 162 by the proper adjustment of the collar 156 relative to the head H^b. This adjustment is carried out by first backing off the lock nut 168 and then threading or unthreading the collar 156 relative to the head's bore 166. Thereafter the lock nut 168 will again be tightened.

Referring now to Figures 15 through 19, the preferred form of thumb screw with overload release P''' embodying the present invention comprises an externally threaded tube T^c shown threaded into the bore 22 of a jig J; a rod R^c coaxially slidably disposed within the tube T^c with its front end 180 abutting one side of a workpiece W; spring means S^c interposed between the tube and the rod for biasing the rod toward the workpiece; a head H^c carried by the rear end of the tube; and lock means L^c interposed between the head and the tube normally keying them together for concurrent rotation relative to the jig J whereby the tube will be moved axially towards the workpiece W.

In this form of the invention the tube T^c is formed with a coaxial longitudinally extending bore 182 having a front portion 184 that is slightly larger in diameter than the main portion thereof. The rear end of the tube is rigidly secured to a sleeve member 186 that is centrally formed with a first bore 188 which is press-fitted to the rear end of the tube, and a second bore 190 disposed rearwardly thereof. The second bore 190 is formed with internal threads 191. A circular plug 192 formed with external threads 193 is threadedly secured within the rear end of the bore 190 of this sleeve 186. An annular groove 194 is formed at the front portion of the sleeve. The rod R^c is of integral construction and includes a main portion 195, a front portion 196 that is of slightly larger diameter and an externally threaded rear post 198. The rod portions 195 and 196 are axially slidably disposed within the bore portions 182 and 184, respectively, of the tube. A collar 200 is threadedly secured to the post 198 and is retained thereon by a lock nut 202. The collar 200 includes an annular flange 204 formed at its rear end. The main portion of the collar 200 is axially slidably disposed within the bore 188 of the sleeve 186. The spring means S^c consists of a helical compression spring which is interposed between the front surface of the plug 192 and the rear of the annular flange 204 of the collar 200. With this arrangement, the rod R^c is constantly biased forwardly toward the workpiece W, the front surface of the flange 204 abutting the shoulder 206 defined between the bores 188 and 190 of the sleeve 186.

As shown in Figures 15 and 16, the sleeve 186 is formed with a radially extending threaded bore 208. This bore 208 threadedly receives a circular guide element 210 which slidably mounts a hexagonal plunger 212. The radially outer end of this plunger 212 is angled as indicated at 214, while the radially inner end thereof is formed with a cavity 216. A spring element 218 disposed in the bore 188 of the sleeve 186 has an end portion 220 that seats within the cavity 216 of the plunger. With this arrangement, the plunger 212 is constantly biased radially outwardly relative to the sleeve 186.

The head includes a cylinder 222 having a slightly larger inside diameter than the outside diameter of the sleeve 186. The front end of this cylinder 222 is integrally formed with a radially inwardly extending flange 224 that defines a bore 226 which encompasses the front portion of the sleeve 186. This flange 224 restrains rearward movement of the head relative to the sleeve 186, while a snap ring 228 restrains forward movement of the head relative to the sleeve. The flange 224 is formed with a pair of diametrically opposed axial bores 232 which mount the front portion of a pair of pins 234. The rear portion of the latter extend into the annular space 236 defined between the sleeve 186 and the head's cylinder 222. The plunger 212 and the pins 234 comprise the lock means L^c.

In the operation of this form of the invention the parts of the thumb screw P''' will initially be disposed in their position of Figures 15 and 16. As the head H^c is rotated in a clockwise direction relative to Figure 16, it will initially impart concurrent clockwise rotation to the sleeve 186 and hence to the tube T^c by virtue of the inter-engagement of the head's pins 234 and the plunger 212, as shown in this figure. The tube will thus be threaded into the bore 22 and the rod R^c will engage the workpiece W. The rod will thereafter remain stationary while the tube continues to move axially to the right relative to Figure 15. During such tube movement the sleeve 186 and hence the plunger 212 will be moved to the right relative to the collar 200. Eventually the radially inner end of the plunger 212 will clear the collar 200 and the plunger will be free to move radially inwardly, as indicated in Figures 18 and 19. Continued clockwise rotation of the head will cause the beveled end 214 of the plunger 212 to be cammed radially inwardly by the pins 234, as will be apparent from Figures 18 and 19. The head will then be free to rotate freely relative to the sleeve 186 and hence the tube T^c.

Referring now to Figures 16 and 19, in order to back the tube T^c out of the jig bore 22 away from the workpiece W, the head is rotated in a counter-clockwise direction. During such counter-clockwise rotation the right-hand edge of the plunger 212 will be engaged by the pins 234. Inasmuch as the right-hand edge of this plunger is straight the pins 234 cannot cam it radially inwardly and it will remain within the annular space 236 under the influence of the spring 218. Accordingly, the counter-clockwise rotation of the head H^c will be transferred to the sleeve 186 and hence to the tube T^c whereby the latter will be backed out of the jig bore 22.

In order that the tube T^c and the rod R^c may provide a positive and unyielding connection between the jig J and the workpiece W, the shoulder between the rod portions 195 and 196 defines an abutment surface 240 which engages a complementary abutment surface 242 defined by the shoulder existing between the tube's bore portions 182 and 184 when the radially inner end of the plunger 212 clears the collar 200. The engagement of the abutment surfaces 240 and 242 may be made to coincide with the radially inward movement of the plunger 212 after it has been cleared by the collar 200 by the proper axial adjustment of the latter relative to the post 198 of the rod R^c. To carry out this adjustment the lock nut 202 should first be backed off. Adjustment of the axial force exerted by the rod R^c upon the workpiece W before the plunger 212 clears the collar 200 may be made by threading or unthreading the plug 192 relative to the bore 190 of the head H^c.

It should be particularly observed that each of the aforedescribed forms of thumb screws embodying the present invention have one feature in common, i. e. in each case the sensing of the amount of axial force exerted upon the workpiece takes place at the point of contact of the screw with the workpiece. In this manner the effect of friction between the threads of the pressure screw and the jig bore is completely eliminated. Accordingly, very accurate results are consistently obtainable.

It should also be observed that although four different forms of disengageable lock means between the rod and the head have been shown and described hereinbefore, it is within the scope of the invention to provide other forms of lock means. It should likewise be observed that various other modifications and changes may be made with respect to the specific construction of the thumb screws with overload releases shown and described herein without departing from the spirit of the invention or the scope of the following claims.

I claim:

1. A thumb screw with overload release for use with a first object formed with a threaded bore and a second object that is positioned adjacent said first object in line with said bore, comprising: an externally threaded tube threadable within the bore of said first object; a rod axially slidably carried within said tube for engaging said second object; a head; spring means interposed between said tube and said rod tending to effect their axial separation; and lock means normally interconnecting said head and said tube in order that they may undergo concurrent rotation, said lock means being rendered inoperative upon the occurrence of a predetermined amount of axial movement of said tube relative to said rod against the force exerted by said spring means.

2. A thumb screw with overload release as set forth in claim 1 having means for adjusting the force exerted by said spring means.

3. A thumb screw with overload release as set forth in claim 2 wherein said tube and said rod are formed with complementary abutment surfaces that interengage upon predetermined axial movement between said tube and rod so as to restrain further movement from taking place therebetween.

4. A thumb screw with overload release for use with a first object formed with a threaded bore and a second object that is positioned adjacent said first object in line with said bore, comprising: an externally threaded tube threadable within the bore of said first object; a rod axially slidably carried within said tube for engaging said second object; a head carried by said tube; spring means interposed between said tube and said rod tending to effect their axial separation, and lock means normally interconnecting said head and said tube in order that they may undergo concurrent rotation in one direction, said lock means being rendered inoperative upon the occurrence of a predetermined amount of axial movement of said tube relative to said rod against the force of said spring means; and backout means interposed between said head and said tube for effecting their interconnection when said lock means is inoperative whereby they may be concurrently rotated in the opposite direction.

5. A thumb screw with overload release for use with a first object formed with a threaded bore and a second object that is positioned adjacent said first object in line with said bore, comprising: an externally threaded tube member threadable within the bore of said first object; a rod member axially slidably carried within said tube member for engaging said second object; a head disposed at the rear of said tube member; a sleeve member having a circumferentially extending notch formed on one of said members; a radially extending latch formed on the other of said members; and, resilient means interposed between said members tending to effect their axial separation and normally retaining said latch within said notch with one of its edges abutting one side of said notch in order that said members may undergo concurrent rotation, said latch becoming disengaged from said notch upon the occurrence of a predetermined amount of axial movement of said tube member relative to said rod member.

6. A thumb screw with overload release as set forth in claim 5 wherein said tube and rod members are formed with complementary abutment surfaces that interengage when said latch is disengaged from said notch so as to restrain further axial movement from taking place between said members.

7. A thumb screw with overload release as set forth in claim 6 wherein said one edge of said latch is formed with a bevel and the opposite edge thereof is straight-sided.

8. A thumb screw with overload release as set forth in claim 7 where said resilient means includes a spring and said pressure screw includes means for adjusting the force exerted by said spring.

9. A thumb screw with overload release for use with a first object formed with a threaded bore and a second object that is positioned adjacent said first object in line with said bore, comprising: an externally threaded tube member threadable within the bore of said first object; a rod member axially slidably carried within said tube member for engaging said second object; a head secured to said rod member; a radially inwardly and rearwardly extending lock surface formed upon said tube member; a complementary radially inwardly and rearwardly extending lock surface formed upon said head; and, resilient means interposed between said members tending to effect their axial separation whereby said lock surfaces will normally be interengaged in order that said members may undergo concurrent rotation, said lock surfaces being disengaged upon the occurrence of a predetermined amount of axial movement of said tube member relative to said rod member.

11. A thumb screw with overload release as set forth in claim 9 wherein said head includes a bore that encompasses the rear portion of said tube member, the rear portion of said tube member is formed with a notch that extends radially inwardly from one of its sides, and a ball element is disposed within said notch.

11. A thumb screw with overhead release as set forth in claim 10 where said resilient means includes a spring and said pressure screw includes means for adjusting the force exerted by said spring.

12. A thumb screw with overload release for use with a first object formed with a threaded bore and a second object that is positioned adjacent said first object in line with said bore, comprising: an externally threaded tube member threadable within the bore of said first object; a rod member axially slidably carried within said tube member for engaging said second object; a head disposed at the rear portion of said tube member and secured to said rod member; axially extending splines formed on said tube member; complementary axially extending splines operatively connected to said rod member; and, resilient means interposed between said members tending to effect their axial separation whereby said splines will normally be interengaged in order that said members may undergo concurrent rotation, said splines being disengaged upon the occurrence of a predetermined amount of axial movement of said tube member relative to said rod member.

13. A thumb screw with overload release as set forth in claim 12 wherein said tube and rod members are formed with complementary abutment surfaces that interengage when said splines are disengaged so as to restrain further axial movement from taking place between said members.

14. A thumb screw with overload release as set forth in claim 13 wherein said head includes a bore that encompasses the rear portion of said tube member, the rear portion of said tube member is formed with a notch that extends radially inwardly from one of its sides, and a backout roller is disposed within said notch.

15. A thumb screw with overload release for use with a first object formed with a threaded bore and a second object that is positioned adjacent said first object in line with said bore, comprising: an externally threaded tube member threadable within the bore of said first object; a rod member axially slidably carried within said tube member for engaging said second object; a head journaled upon the rear portion of said tube member and defining an annular space therebetween; an axially extending pin secured to said head and disposed within said space; a radially extending passage formed in said tube member; a plunger slidably disposed in said passage and having its radially outer portion constantly biased into said annular space, the radially outer portion of said plunger being formed with a bevel; a collar formed on said rod member for abutting the radially inner end of said plunger whereby said pin will engage the beveled portion of said plunger and cause rotation of said head to effect concurrent rotation of said tube member; and, resilient means interposed between said tube and rod members tending to effect their axial separation whereby said collar will normally be radially aligned with said plunger, said collar moving out of alignment with said plunger upon the occurrence of a predetermined amount of axial movement of said tube member relative to said rod member.

16. A thumb screw with overload release as set forth in claim 15 wherein said tube and rod members are formed with complementary abutment surfaces that interengage when said collar moves out of alignment with said plunger so as to restrain further axial movement from taking place between said members.

17. A thumb screw with overload release as set forth in claim 16 where said resilient means includes a spring and said pressure screw includes means for adjusting the force exerted by said spring.

References Cited in the file of this patent

UNITED STATES PATENTS

| | | |
|---|---|---|
| 2,373,812 | Coop | Apr. 17, 1945 |
| 2,536,225 | Rice | Jan. 2, 1951 |
| 2,602,664 | Matchett | July 8, 1952 |
| 2,634,650 | Coop | Apr. 14, 1953 |